(12) United States Patent
Yamamoto et al.

(10) Patent No.: US 10,615,997 B2
(45) Date of Patent: Apr. 7, 2020

(54) IN-VEHICLE GATEWAY DEVICE

(71) Applicant: HITACHI AUTOMOTIVE SYSTEMS, LTD., Ibaraki (JP)

(72) Inventors: Naoyuki Yamamoto, Hitachinaka (JP); Kazuhiro Nakanishi, Hitachinaka (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 82 days.

(21) Appl. No.: 15/765,052

(22) PCT Filed: Sep. 20, 2016

(86) PCT No.: PCT/JP2016/077616
§ 371 (c)(1),
(2) Date: Mar. 30, 2018

(87) PCT Pub. No.: WO2017/061262
PCT Pub. Date: Apr. 13, 2017

(65) Prior Publication Data
US 2018/0287815 A1    Oct. 4, 2018

(30) Foreign Application Priority Data
Oct. 5, 2015    (JP) .................. 2015-197296

(51) Int. Cl.
*H04L 12/46* (2006.01)
*H04L 29/12* (2006.01)
*H04L 12/40* (2006.01)

(52) U.S. Cl.
CPC ........ *H04L 12/46* (2013.01); *H04L 12/40006* (2013.01); *H04L 12/4625* (2013.01);
(Continued)

(58) Field of Classification Search
CPC .............. H04L 12/46; H04L 12/40006; H04L 12/4625; H04L 61/106; H04L 61/2007;
(Continued)

(56) References Cited

U.S. PATENT DOCUMENTS 8,848,608 B1 *  9/2014  Addepalli ............. H04W 4/046
                                                         370/328
2013/0026979 A1   1/2013  Endo et al.
(Continued)

FOREIGN PATENT DOCUMENTS

JP    2010-154097 A    7/2010
JP    2013-31324 A     2/2013
(Continued)

OTHER PUBLICATIONS

International Search Report for WO 2017/061262 A1 dated Dec. 27, 2016.

*Primary Examiner* — Tauqir Hussain
(74) *Attorney, Agent, or Firm* — Volpe and Koenig, P.C.

(57) ABSTRACT

Provided is an in-vehicle gateway device which is capable of performing efficient path selection control when data is transferred to a different network. In an in-vehicle gateway device that performs transfer control of data between a first network and a second network, the second network has a different network form from the first network, and a virtual IP address is allocated to the second network.

7 Claims, 5 Drawing Sheets

(52) U.S. Cl.
CPC ........ *H04L 61/106* (2013.01); *H04L 61/2007* (2013.01); *H04L 61/6027* (2013.01); *H04L 2012/40215* (2013.01); *H04L 2012/40234* (2013.01); *H04L 2012/40241* (2013.01)

(58) Field of Classification Search
CPC ....... H04L 61/6027; H04L 2012/40215; H04L 2012/40234; H04L 2012/40241
USPC ........................................................ 709/218
See application file for complete search history.

(56) References Cited

U.S. PATENT DOCUMENTS

2015/0029987 A1\* 1/2015 Addepalli ............. H04W 4/046
370/329
2015/0229741 A1 8/2015 Kim et al.

FOREIGN PATENT DOCUMENTS

| JP | 2014-154920 A | 8/2014 |
|----|---------------|--------|
| JP | 2015-67187 A | 4/2015 |
| JP | 2015-154481 A | 8/2015 |

\* cited by examiner

FIG. 3

ROUTING MAP

| DESTINATION IP (VIRTUAL IP ADDRESS) | OUTPUT DESTINATION |
|---|---|
| 192.168.0.1 | CAN 1 NETWORK |
| 192.168.0.2 | CAN 2 NETWORK |
| 192.168.0.11 | LIN NETWORK |
| 192.168.0.21 | FlexRay NETWORK |
| 192.168.0.31 | MOST NETWORK |

IN-VEHICLE GATEWAY DEVICE

TECHNICAL FIELD

The present invention relates to an in-vehicle gateway device.

BACKGROUND ART

A network between electronic control units (hereinafter referred to as ECUs) in a vehicle is mainly configured by a controller area network (CAN) standard. The CAN is a network characterized by a line type network configured by connecting respective ECUs on a line.

However, an in-vehicle network device connected to the same network and an in-vehicle network device connected to a different network via a gateway (relay) device are expected to coexist in the future.

For example, a technique of performing a path selection control process of a transmission destination when received data is transmitted to a certain transmission destination is disclosed in PTL 1. PTL 1 discloses "a communication path information relay means for translating received address information on the basis of an address translation table and relaying it to a transmission destination and a packet relay means for translating address information of a received packet on the basis of a network address translation table and relaying it to a transmission destination." Specifically, an IP address of a reception side device is translated into an IP address of a transmission destination through the address translation table, and data is transferred.

CITATION LIST

Patent Literature

PTL 1: JP 2010-154097 A

SUMMARY OF INVENTION

Technical Problem

In the future, with automatic driving and development of cameras, Ethernet (registered trademark) which enables high-speed transfer is necessary as a network between a camera ECU and an ECU. Ethernet is a network characterized by a peer-to-peer type network in which a communication destination is specified on the basis of a device-specific IP address. In the in-vehicle network, an in-vehicle Ethernet is increasingly employed as a network that supplements the existing CAN standard. In this regard, there has been a need for development of the in-vehicle gateway device in which a characteristic of the CAN and a characteristic of Ethernet are considered. This point is not considered in PTL 1, and there is room for improvement.

In this regard, it is an object of the present invention to provide an in-vehicle gateway device which is capable of performing efficient path selection control when data is transferred to a different network.

In addition to the CAN and Ethernet, networks conforming to standards such as Local Interconnect Network (LIN), FlexRay, and media oriented systems transport (MOST) may be used as the in-vehicle network.

Solution to Problem

To achieve the above object, as an in-vehicle gateway device of the present invention, for example, in an in-vehicle gateway device that performs transfer control of data between a first network and a second network, the second network has a different network form from the first network, and a virtual IP address is allocated to the second network.

Advantageous Effects of Invention

According to the present invention, it is possible to provide an in-vehicle gateway device which is capable of performing efficient path selection control when data is transferred to a different network.

BRIEF DESCRIPTION OF DRAWINGS

FIG. 3 is a flowchart of the in-vehicle gateway device of the present invention.

DESCRIPTION OF EMBODIMENTS

Hereinafter, embodiments will be described.

First Embodiment

Figure 1:
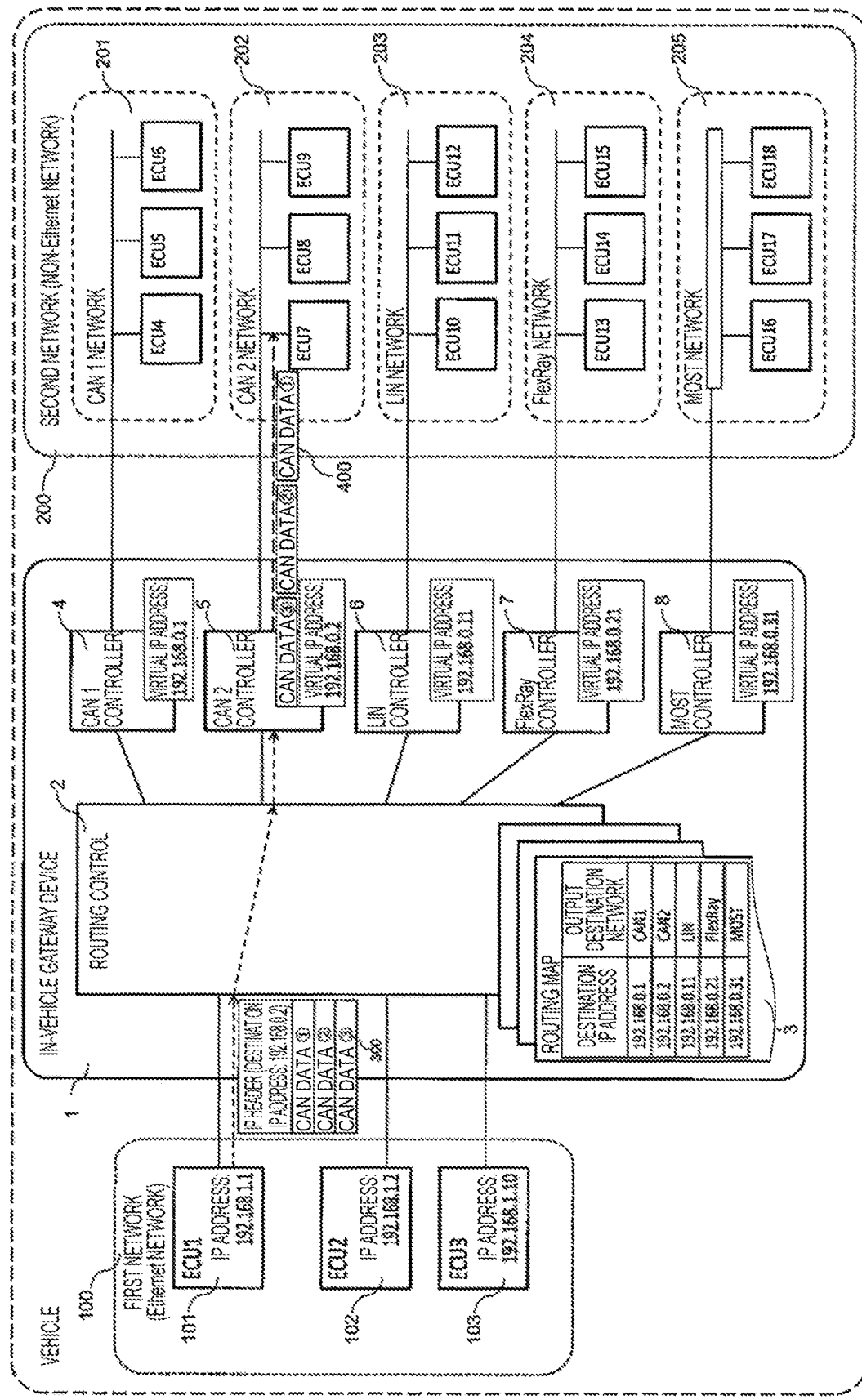
FIG. 1 is a schematic configuration diagram of an in-vehicle gateway device and an in-vehicle network system according to one embodiment of the present invention.
Figure 2:
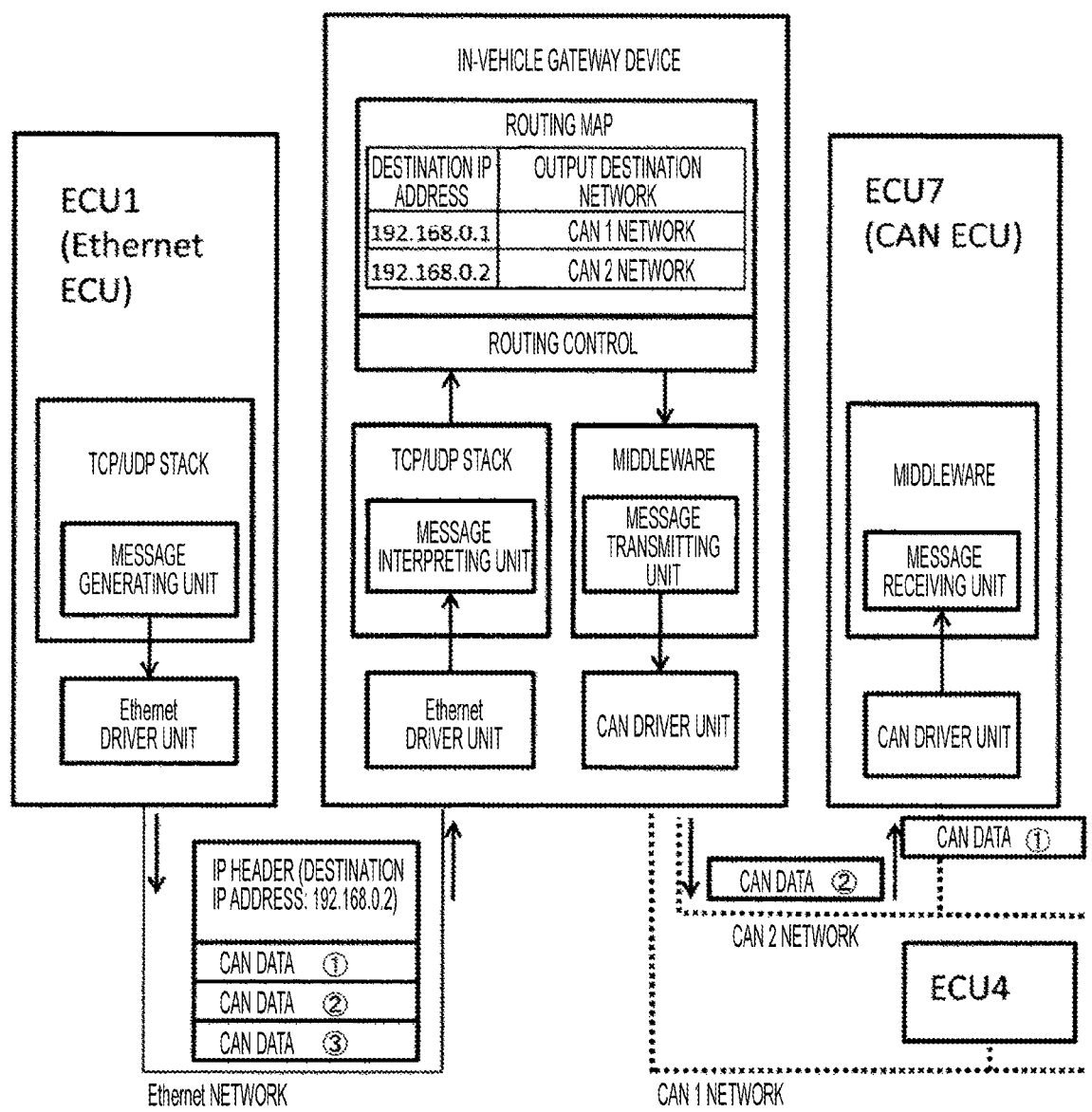
FIG. 2 is a schematic software configuration diagram of the in-vehicle gateway device and the in-vehicle network system of the present invention.
Figure 4:
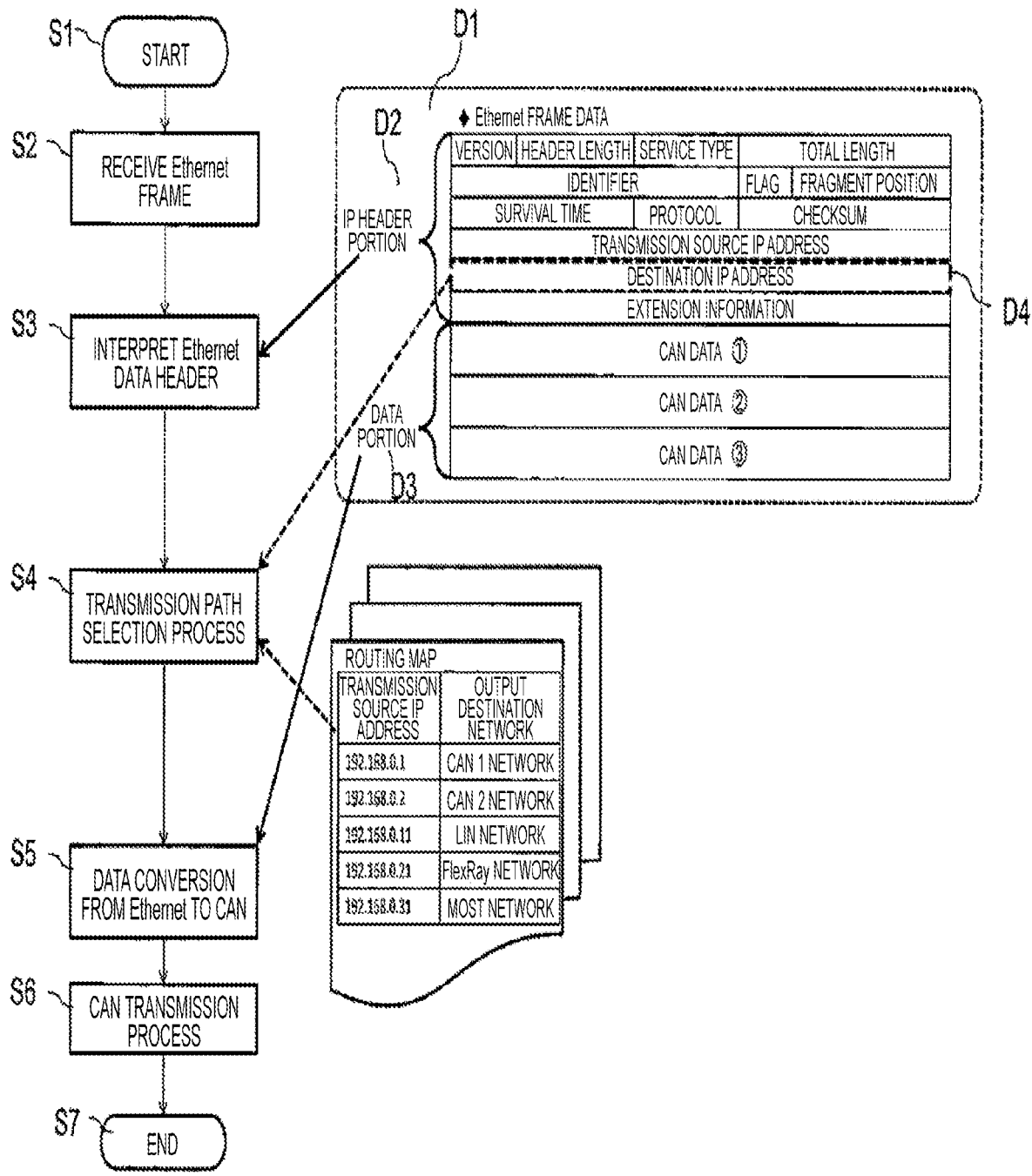
FIG. 4 is a routing table of the in-vehicle gateway device of the present invention.

An in-vehicle gateway device and an in-vehicle network system according to one embodiment of the present invention will be described with reference to FIG. 1.

An in-vehicle gateway device 1 is a device which connects communication between a first network 100 and a second network (a non-Ethernet network) 200. The first network 100 is an Ethernet network and includes a plurality of Ethernet connection ECUs, that is, an ECU 1 (101) that transmits data to the in-vehicle gateway device 1, an ECU 2 (102) that transmits data to the in-vehicle gateway device 1, and an ECU 3 (103) that transmits data to the in-vehicle gateway device 1. As illustrated in an example of FIG. 1, the second network (a non-Ethernet network) 200 includes a plurality of networks of a single type or a plurality of types, that is, a CAN 1 network 201 that receives data from a CAN 1 controller 4, a CAN 2 network 202 that receives data from a CAN 2 controller 5, an LIN network 203 that receives data from an LIN controller 6, a FlexRay network 204 that receives data from a FlexRay controller 7, and a MOST network 205 that receives data from an MOST controller 8.

The in-vehicle gateway device 1 includes a routing control unit 2 that determines a data transfer destination, a routing map 3 indicating a correspondence between an IP address and an output destination, the CAN 1 controller 4 that transfers data to the CAN 1 network 201, the CAN 2 controller 5 that transfers data to the CAN 2 network 202, the LIN controller 6 that transfers data to the LIN network 203, the FlexRay controller 7 that is connected with the FlexRay network 204, and the MOST controller 8 that transfers data to the MOST network 205.

In the first embodiment, an example of transferring data from the ECU 1 (101) of the first network 100 to the second network 200 will be described.

As preparation for data transfer from the first network 100 to the second network 200, a virtual IP address is allocated to each network in the second network 200 which is the output destination in the routing map 3 of the in-vehicle gateway device 1. The routing map 3 is a path selection map in which a destination IP address is associated with an output destination network by setting a virtual IP address.

In a case in which it is desired to pass data from the ECU 1 (101) of the first network 100 to the ECU 7 of the second network 200, the ECU 1 (101) decides a virtual IP address corresponding to an output destination network which is a line connected to the ECU 7 to which data is desired to be passed. The ECU 1 (101) generates an IP header portion D2 using the decided virtual IP address as a destination IP address D4. The ECU 1 (101) generates a CAN data frame compatible with the CAN 2 network 202 serving as a target network of the data transfer destination and sets the CAN data frame in a data portion D3. A plurality of CAN data frames can also be set. The ECU 1 (101) combines the generated IP header portion D2 and the data portion D3 of the CAN data frame and generates an Ethernet data frame D1. The ECU 1 (101) transmits the Ethernet data frame D1 (300) to the in-vehicle gateway device.

The routing control unit 2 of the in-vehicle gateway device analyzes the Ethernet data frame 300 received from the first network 100 and specifies the destination IP address of the IP header. The routing control unit 2 searches for the specified destination IP address and the destination IP of the routing map 3 and decides the CAN 2 network 202 serving as the output destination network associated with the same IP address as the data transfer destination. The routing control unit 2 gives an instruction to transfer data to the CAN 2 network 202 of the decided transfer destination to the CAN 2 controller 5.

The CAN 2 controller 5 discards the IP header portion D2 and divides a plurality of CAN data frames 400 of the data portion D3 into CAN data frame units compatible with the CAN 2 network 202. (S5) The CAN 2 controller 5 transmits the divided CAN data frame 400 units to the CAN 2 network 202.

The ECU 7, the ECU 8, and the ECU 9 connected to the CAN 2 network 202 receive the CAN data 400 flowing to the network.

Since the virtual IP address is allocated to the non-Ethernet network (CAN, CAN-FD, LIN, FlexRay, and MOST) in this way, it is possible to transfer data to a network of a transmission target using the destination IP address of the IP header information of the Ethernet standard.

Further, since the transmission destination is identified for each network instead of managing identification information (a CAN ID, an IP address, or the like) for each ECU device, it is possible to reduce management information of routing and data conversion and reduce a memory of the gateway device.

Further, even in a case in which an ECU compatible with a non-Ethernet network (CAN, CAN-FD, LIN. FlexRay. or MOST) is newly added, data transfer is performed using the destination IP address of the IP header information of the Ethernet standard, and thus it is not necessary to additionally update the management information on the gateway side, and data can be transferred to the new ECU.

Second Embodiment

Figure 5:
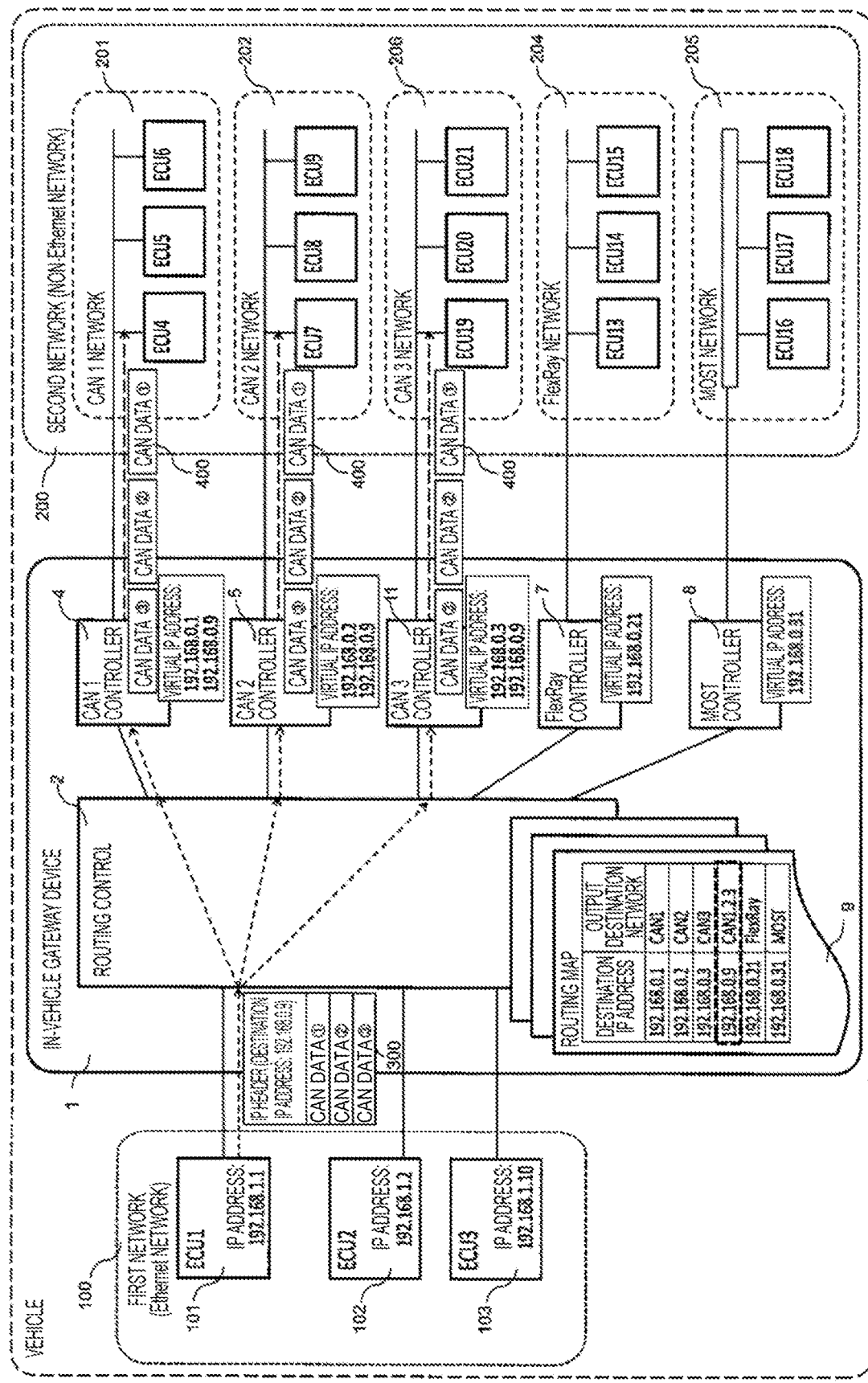
FIG. 5 is a schematic configuration diagram of a system according to a second embodiment of the present invention.

Next, another embodiment of the present invention will be described with reference to FIG. 5. Descriptions of components similar to those in the above-described embodiment will be omitted.

In the present embodiment, it is possible to set a plurality of virtual IP addresses for the same output destination network. Further, if the virtual IP address is the same, and a type of network is the same, it is possible to set transfer to a plurality of output destination networks. In the second embodiment, the same virtual IP is allocated to a CAN 1 controller 4, a CAN 2 controller 5, and a CAN 3 controller 11.

As a specific example, an IP address which can be designated as a transfer destination is set for the same type network in the second network 200 in a routing map 9. The routing control unit 2 searches for the IP address of the specified destination and the destination IP of the routing map 9, and decides it as the data transfer destination for all the output destination networks associated with the same IP address (a CAN 1 network 201, a CAN 2 network 202, and a CAN 3 network 206).

The routing control 2 unit gives an instruction to transfer data to a plurality of CAN networks serving as the decided transfer destination, that is, the CAN 1 network 201, the CAN 2 network 202, and the CAN 3 network 206.

Effects similar to those in the above-described embodiment can be obtained through such a configuration.

REFERENCE SIGNS LIST 1 in-vehicle gateway device
2 routing control
3 routing map
4 CAN 1 controller
5 CAN 2 controller
6 LIN controller
7 FlexRay controller
8 MOST controller
100 first network (Ethernet network)
101 ECU 1
102 ECU 2
103 ECU 3
200 second network (non-Ethernet network)
201 CAN 1 network
202 CAN 2 network
203 LIN network
204 FlexRay network
205 MOST network
300 Ethernet data frame
400 CAN data frame

The invention claimed is:

1. An in-vehicle gateway device that performs transfer control of data between a first network and a second network, comprising;
   a controller; and
   a map coupled with the controller, the map containing a plurality of virtual destination IP addresses and a plurality of output destinations for the second network and one of each of the plurality of virtual destination IP addresses corresponds to one of each of the plurality of output destinations for the second network,
   the controller is configured to:
      receive from the first network a data frame, the data frame includes at least one CAN data frame that is compatible with the second network and IP header information including at least one virtual destination IP address,
      analyze the data frame and specify the virtual destination IP address received from the first network,
      search the plurality of virtual destination IP addresses and corresponding plurality of output destinations in the map for the specified virtual destination IP address received from the first network and the corresponding output destination of the second network, delete the header information from the data frame and divide the at least one CAN data frame into CAN data frame units so that the CAN data frame units are compatible with the corresponding output destination of the second network, and transfer the CAN data frame units to the corresponding output destination of the second network, wherein the second network is a different network form from the first network, and wherein the second network includes at least one network and a virtual destination IP address is allocated to each of the at least one network in the second network.

2. The in-vehicle gateway device according to claim 1, wherein the virtual destination IP address of the second network to which the CAN data frame units are transmitted, is set for the data frame transferred from the first network to the second network.

3. The in-vehicle gateway device according to claim 1, wherein there are a plurality of second networks, and the virtual destination IP address is allocated to each of the plurality of second networks.

4. The in-vehicle gateway device according to claim 1, wherein an ECU connected to the second network is used together with the in-vehicle gateway device.

5. The in-vehicle gateway device according to claim 1, wherein the data frame is simultaneously transferred from a destination IP address from the first network to a plurality of output destinations associated with the virtual destination IP address of the second network.

6. The in-vehicle gateway device according to claim 1, wherein an ECU connected with the first network generates the data frame.

7. The in-vehicle gateway device according to claim 1, wherein the at least one CAN data frame serves as a target network of the output destination of the second network.

* * * * *